June 17, 1952     J. L. WILSON     2,601,197

CAGE FOR POULTRY AND ANIMALS

Filed Dec. 20, 1948     2 SHEETS—SHEET 1

INVENTOR
Joseph Leo Wilson
by Edward N. Fetherstonhaugh
ATTORNEY

INVENTOR
Joseph Leo Wilson
by Edward N. Fetherstonhaugh
ATTORNEY

Patented June 17, 1952

2,601,197

UNITED STATES PATENT OFFICE 2,601,197

CAGE FOR POULTRY AND ANIMALS

Joseph Leo Wilson, Saint Thomas, Ontario, Canada

Application December 20, 1948, Serial No. 66,220

1 Claim. (Cl. 220—19)

The invention relates to improvements in a cage for poultry and animals, as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a portable cage for poultry and animals which may be easily transported from one location to another; to furnish a cage or crate for fowl or small animals which is of light construction and may be easily kept clean; to contrive a shipping crate or cage in which the fowl or the like may be easily removed therefrom without removing the crates from their piled position in a warehouse, a chick hatchery, or on a transportation vehicle; to make a crate for fowl and the like which may serve in tiers to hold chickens for a period of time for feeding or to detain setting hens over the brooding period; and generally to provide a cage or crate for fowl and animals which will be durable, sanitary and efficient for its purpose.

In the drawings.

Like numerals of reference indicate corresponding parts in the various figures.

Figure 1:
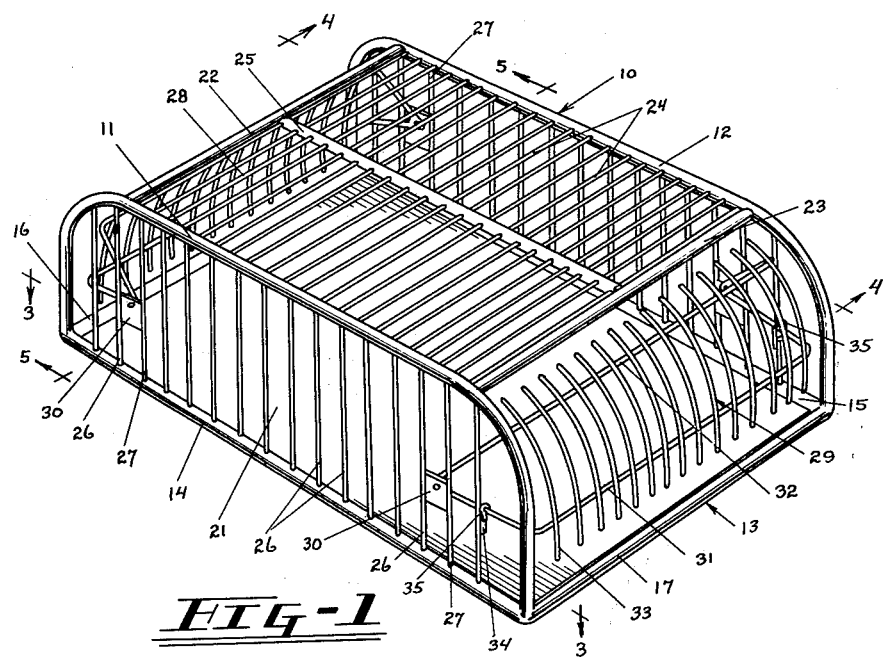
Figure 1 is a perspective view of the cage or crate showing the gates in each end in a closed position.
Figure 2:
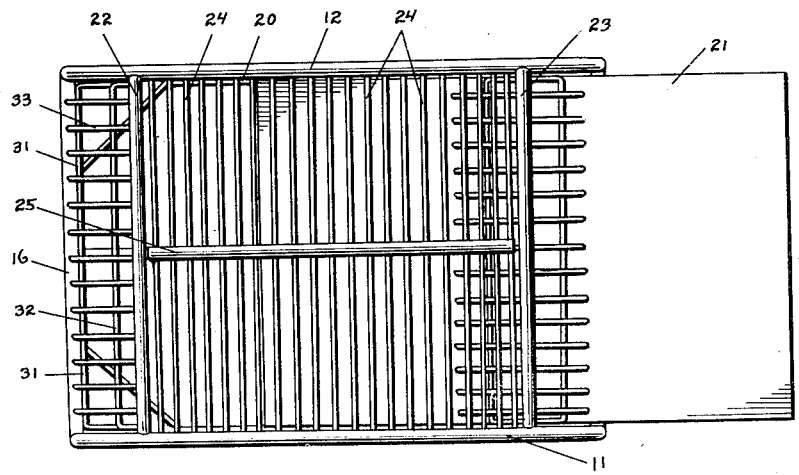
Figure 2 is a plan view of Figure 1 showing the bottom plate partially removed from the cage.
Figure 3:
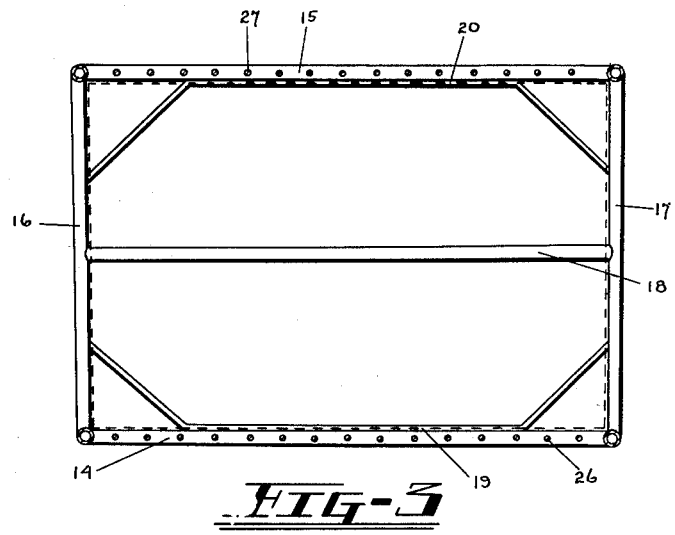
Figure 3 is a plan sectional view of the cage taken on the line 3—3 in Figure 1.
Figure 4:
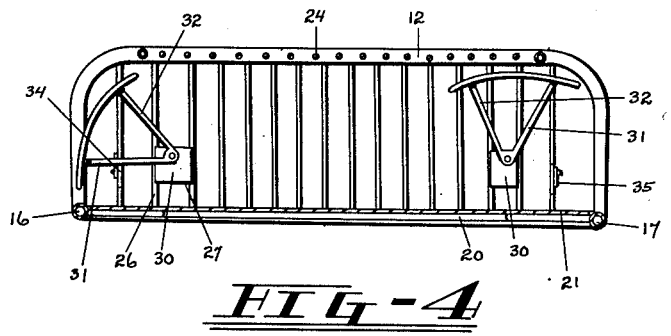
Figure 4 is a longitudinal view through the cage as taken on the line 4—4 in Figure 1, and showing one of the gates in an open position while the other of the same is in a closed position.
Figure 5:
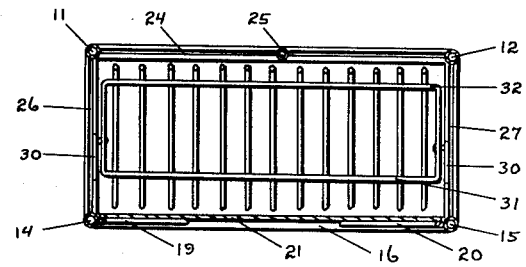
Figure 5 is a transverse section through the cage as taken on the line 5—5 in Figure 1 and showing one of the gates at the end thereof in a closed position.

The invention as hereinafter described is particularly adapted for use with various types of fowl and in this instance, the cage or crate is made of aluminum tubing and bar stock fixedly assembled together. However, it will be understood that this cage or crate might be used for detaining various species of small animals and the construction of the same could be varied so that it might be fabricated in plastic, wood or any other material without generally affecting the advantages of the invention.

Referring to the drawings, the cage or crate, as indicated by the numeral 10, consists of a pair of upper longitudinal side rails 11 and 12 which extend along the upper edges of the cage, and at each end thereof these rails are bent in an arcuate manner and extend vertically downward to join the base frame 13. In this instance, the side rails 11 and 12 are formed of a metal tubing and the lower free ends of the same are welded or otherwise secured to the corners of the base frame 13. This base frame consists of the tubular side members 14 and 15, and the tubular end members 16 and 17 which are welded or otherwise secured together where they join one another. The bottom reinforcing member 18 of tubular formation extends longitudinally and is welded or otherwise secured to the center portion of the tubular end members 16 and 17.

Support bars 19 ad 20 extend along a portion of the tubular side members 14 and 15, respectively, and are suitably secured to the inner side thereof. Each end of these support bars 19 and 20 extend outward at an angle from their respective tubular side members 14 and 15, and the free ends of same are fixedly secured to the tubular end members 16 and 17, thus forming corner supports or braces for the base frame 13. The bottom plate 21 is movably supported within the cage and rests on the support bars 19 and 20 and the bottom reinforcing member 18.

Upper lateral members 22 and 23 are welded or otherwise secured at the ends thereof to the upper side rails 11 and 12 towards the arcuately shaped end portion of the latter. A plurality of lateral bars 24 extend through a longitudinal hollow member 25 and the free ends of the former are welded or otherwise secured to the inner side of the upper side rails 11 and 12. This longitudinal hollow member has a plurality of holes in same through which the lateral bars pass and the former is adapted to suitably space these bars 24 apart and keep the same in alignment with respect to one another, as well as reinforcing the assembly thereof. The assembly of the lateral bars 24 which are suitably spaced apart and bordered by the upper side rails 11 and 12 and the upper lateral members 22 and 23, and the latter extend parallel to these bars 24. It will be noted that one of the principal features of the invention is the fact that the upper lateral members 23 and 24 are short of the ends of the cage and when the ends of same are open, a portion of the top of the cage adjacent to the ends is also open, facilitating the placing of the fowl or animals within the cage or removing the same therefrom.

A plurality of vertical side members 26 and 27 extend between the horizontal portion of the upper side rails 11 and 12, and the tubular side members 14 and 15, respectively. A pair of gates or closures 28 and 29 are pivotally supported on the mounting plates 30 which are located at each side of the open end and fixedly secured to a pair of vertical side members 26 and 27. The gates 28 and 29 each consist of a pair of lateral members 31 and 32 which are bent inward towards the end thereof, and these end portions extend inward at an angle to join one another. The junction of the ends of the lateral members 31 and 32 serves as a pivot point for the gates 28 and 29. A plurality of arcuately shaped bars 33 are welded or otherwise secured to the lateral members 31 and 32 thus completing the gate. A stop block 34 is located at each side of the gates 28 and 29 and fixedly secured to the vertical side members which are next to the vertically extending end portions of the side rails 11 and 12. Locking hooks 35 are pivotally secured to each of the stop blocks 34 and are adapted to hook over the end portions of the lateral members 31 which form a part of the gates, thus maintaining the latter substantially in a closed position.

In the use of the invention, poultry, animals and the like may be detained within the cage for various purposes, as hereinbefore set forth. The occupants may be easily placed in the cake by simply hinging either of the gates 28 or 29 upward so as to render either end thereof open, and either of these gates are then easily closed by simply hinging the same downward, thus closing the open end or ends of the cage. In removing the occupants from the cage, the gates may be hinged upward in a similar manner as hereinbefore mentioned. The particular construction of the cage makes it possible to remove fowl or animals therefrom when the same are stacked in tiers or when the cages abut one another without disturbing the position of same. This is accomplished due to the fact that the gates 28 and 29 are of an arcuate formation and enclose the end portions of the cage, as well as the upper portion of the same adjacent to the ends thereof. In this respect, when the cages are stacked in tiers, the occupants may always be removed from either end thereof, by removing the same horizontally therefrom. Should the ends of the cages abut one another, the occupants may be removed by raising the same upward vertically therefrom.

What I claim is:

A cage comprising a framework fixedly mounted on a base frame and consisting of spaced apart lateral members forming the top and vertical spaced apart members constituting the sides of the cage, the top, sides and base frame all being fixed with respect to each other, a removable bottom supported on said base frame, a gate located at each of the open ends of said cage comprising a pair of lateral members being spaced apart and having their ends converging inwardly at an angle to join one another, a plurality of arcuately shaped bars fixedly secured to the said pair of lateral members to project beyond the same, the said arcuate bars terminating short of the top and the bottom of said cage, a mounting plate located on each side of the open end and being fixedly secured to a pair of the vertical side members of the cage, the converging ends of the said lateral members of said gate being in pivotal engagement with said mounting plates, a stop block located at each side of said gate and fixedly secured to the vertical side members of the cage next to the end of the cage, locking hooks pivotally connected to said stop blocks and adapted to hook over the end portions of said lateral members of said gate to keep said gate in its closed position, the pivoting of said lateral gate members upward adapting said arcuate shaped bars thereon to be brought beneath the top of the cage to thus open the end of the cage, downward pivoting of said lateral members effecting a closure of the opening by the said arcuate bars.

JOSEPH LEO WILSON.

REFERENCES CITED

The following references are of record in the file of this patent:

UNITED STATES PATENTS

| Number | Name | Date |
|---|---|---|
| 141,389 | Selling | July 29, 1873 |
| 890,649 | Hill | June 16, 1906 |
| 999,920 | Von Schoonhoven | Aug. 8, 1911 |
| 1,451,449 | Peterman | Apr. 10, 1923 |
| 1,613,171 | Hoffman | Jan. 4, 1927 |
| 2,109,902 | Hatch et al. | Mar. 1, 1938 |